(12) United States Patent
Kalia et al.

(10) Patent No.: US 11,533,376 B2
(45) Date of Patent: Dec. 20, 2022

(54) MIGRATING PHYSICAL LAYER IN VIRTUALIZED RADIO ACCESS NETWORKS

(71) Applicant: Microsoft Technology Licensing, LLC, Redmond, WA (US)

(72) Inventors: Anuj Kalia, Newcastle, WA (US); Ilias Marinos, Cambridge (GB); Daehyeok Kim, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/323,544

(22) Filed: May 18, 2021

(65) Prior Publication Data
US 2022/0377145 A1  Nov. 24, 2022

(51) Int. Cl.
*H04L 67/148* (2022.01)
*G06F 9/54* (2006.01)
*H04W 88/08* (2009.01)

(52) U.S. Cl.
CPC ........... *H04L 67/148* (2013.01); *G06F 9/546* (2013.01); *G06F 9/547* (2013.01); *H04W 88/08* (2013.01)

(58) Field of Classification Search
CPC ....... H04L 67/148; G06F 9/546; G06F 9/547; H04W 88/08
See application file for complete search history.

(56) References Cited

U.S. PATENT DOCUMENTS

| 2013/0281049 A1* | 10/2013 | Lee ...................... H04W 24/00 455/405 |
| 2014/0362829 A1 | 12/2014 | Kazmi et al. |
| 2016/0073426 A1* | 3/2016 | Bull ................... H04W 72/1273 370/336 |
| 2017/0054817 A1* | 2/2017 | Wang ..................... H04L 67/148 |
| 2017/0353903 A1* | 12/2017 | Rost ....................... H04W 36/10 |
| 2018/0323932 A1* | 11/2018 | Huang .................... H04B 1/713 |
| 2019/0208575 A1* | 7/2019 | Barbieri .............. H04W 88/085 |

FOREIGN PATENT DOCUMENTS

CN      106714184 A      5/2017

OTHER PUBLICATIONS

"Small Cell Forum FAPI and nFAPI specifications", In Small Cell forum Release 9.0, May 19, 2017, 335 Pages.
"International Search Report and Written Opinion Issued in PCT Application No. PCT/US22/026243", dated Aug. 2, 2022, 11 Pages.

* cited by examiner

*Primary Examiner* — Jeong S Park
(74) *Attorney, Agent, or Firm* — ArentFox Schiff LLP

(57) ABSTRACT

Described are examples for providing cell level migration of physical layer processing in a virtualized base station. A system for operating virtualized base stations includes a plurality of physical layer (PHY) servers within a datacenter and a media access control (MAC) server. Each respective PHY server includes: a memory storing instructions and at least one processor coupled to the memory. The at least one processor is configured to perform physical layer radio access network processing for a cell at the respective PHY server. The MAC server includes a memory storing instructions and at least one processor coupled to the memory. The at least one processor is configured to migrate the physical layer radio access network processing for the cell from a first server of the plurality of PHY servers to a second server of the plurality of PHY servers within the datacenter at an inter-slot boundary.

20 Claims, 6 Drawing Sheets

MIGRATING PHYSICAL LAYER IN VIRTUALIZED RADIO ACCESS NETWORKS

BACKGROUND

A radio access network (RAN) may provide multiple user devices with wireless access to a network. The user devices may wirelessly communicate with a base station, which forwards the communications towards a core network. Conventionally, a base station in the RAN is implemented by dedicated processing hardware (e.g., an embedded system) located close to a radio unit including antennas. The base station may perform lower layer processing including physical (PHY) layer and media access control (MAC) layer processing for one or more cells. There may be costs associated with deploying dedicated processing hardware for each base station in a RAN, particularly for a RAN including small cells with relatively small coverage areas. Additionally, the dedicated processing hardware may be a single point of failure for the cell.

A virtualized radio access network may utilize an edge datacenter with generic computing resources for performing RAN processing for one or more cells. That is, instead of performing PHY and MAC layer processing locally on dedicated hardware, a virtualized radio access network may forward radio signals from the radio units to the edge datacenter for processing and similarly forward signals from the edge datacenter to the radio units for wireless transmission. In one specific example, cloud-computing environments can be used to provide mobile edge computing (MEC) where certain functions of a mobile network can be provided as workloads on nodes in the cloud-computing environment. In MEC, a centralized unit (CU) can be implemented in a back-end node, one or more distributed units (DUs) can be implemented in intermediate nodes, and one or more radio units (RUs) may be deployed remotely, for example, on a rooftop. and various remote units (RU), The DUs, which can be deployed at edge serves and provide media access control (MAC) and at least some physical (PHY) and/or media access control (MAC) layers processing of a base station or other RAN node of the mobile network, can be deployed at edge serves. The DUs may also provide radio link control (RLC) layer processing. The Radio units (RUs) may perform basic PHY layer processing such as fast Fourier transform (FFM) at an antenna, which may be deployed, for example, on a rooftop. RUs can communicate with the CU via one or more DUs. In an example, the DUs CUs can provide higher network layer functionality for the RAN, such as radio link resource control (RLCRRC) or packet data convergence protocol (PDCP) layer functions. The RUs can facilitate access to the CU for various downstream devices, such as user equipment (UE), Internet-of-Things (IoT) devices, etc.

Because the edge datacenter utilizes generic computing resources, a virtualized RAN may provide scalability and fault tolerance for base station processing. For example, the edge datacenter may assign a variable number of computing resources (e.g., servers) to perform PHY layer processing for the radio units associated with the edge datacenter based on a workload. Further, a virtualized RAN may perform processing at a different server if a fault is detected at a server currently performing the processing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a system for operating a virtualized base station is provided. The system includes a plurality of physical layer (PHY) servers within a datacenter and a media access control (MAC) server. Each respective PHY server includes: a memory storing one or more parameters or instructions for performing PHY processing for one or more cells of a virtualized base station; and at least one processor coupled to the memory. The at least one processor is configured to perform physical layer radio access network processing for a cell at the respective PHY server. The MAC server includes a memory storing one or more parameters or instructions for performing MAC layer processing for one or more cells; and at least one processor coupled to the memory. The at least one processor is configured to migrate the physical layer radio access network processing for the cell from a first server of the plurality of PHY servers to a second server of the plurality of PHY servers within the datacenter at an inter-slot boundary.

In another example, a computer-implemented method for operating a virtualized base station is provided. The method includes performing physical layer radio access network processing for a cell at a first server within a datacenter that performs physical layer processing for at least one virtualized base station. The method includes migrating the physical layer radio access network processing for the cell to a second server within the datacenter at an inter-slot boundary. The method includes performing physical layer radio access network processing for the cell at the second server after the inter-slot boundary.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to cell migration for virtualized radio access networks (RANs). The term "cell" refers to a radio network object that can be uniquely identified by a User Equipment (UE) from an identification that is broadcasted over a geographical area from one access point. A cell may be associated with a channel bandwidth (e.g., 20 MHz). A virtualized base station refers to computing resources that perform RAN processing for one or more cells. In some aspects, a virtualized base station is implemented at a datacenter that may include multiple servers for physical (PHY) layer processing. A first server may perform PHY layer processing for at least one cell of the virtualized base station. For example, the first server may receive media access control (MAC) layer messages and generate samples for transmission via a radio unit or the server may receive samples from the radio unit and generate MAC layer messages. The datacenter may migrate a cell from the first server to a second server at a slot boundary. The second server may resume PHY layer processing for the cell after the slot boundary. Accordingly, the datacenter may migrate PHY layer processing between servers without interruption of service provided by the virtualized base station.

In an aspect, the servers performing PHY layer processing may be separate from one or more servers performing MAC layer processing. Conventionally, a network functional application platform interface (nFAPI) is used to separate PHY and MAC processing between different hardware devices. nFAPI, however, utilizes a stateful connection between the PHY and the MAC via stream control transmission protocol (SCTP). This connection state makes it difficult to move the PHY processing seamlessly between servers. In some implementations, the servers may be connected with high-speed wired connections (e.g., 100 Gigabits per second (Gbps) Ethernet) that can provide reliability without a stateful connection such as SCTP. For example, the MAC layer messages may be carried over stateless user datagram protocol (UDP) packets over an Ethernet link enabled with priority-based flow control (IEEE 802.1Qbb) to prevent packet loss. Further, the cell migration may be accomplished by changing routing of the UDP packets because of the stateless nature of the connection.

Figure 3:
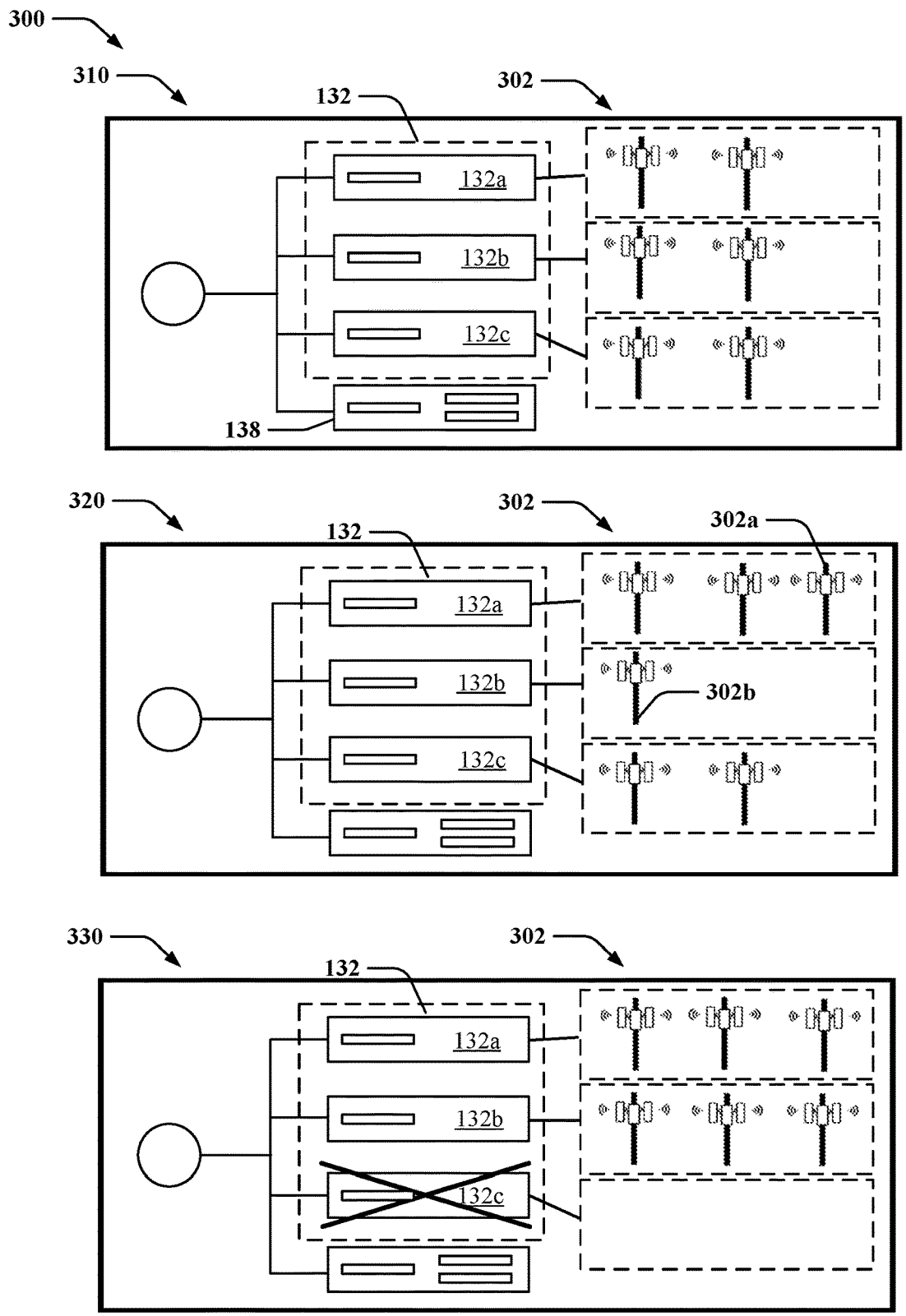
FIG. 3 is a diagram of examples of cell migration in a virtualized RAN, in accordance with aspects described herein.
Figure 4:
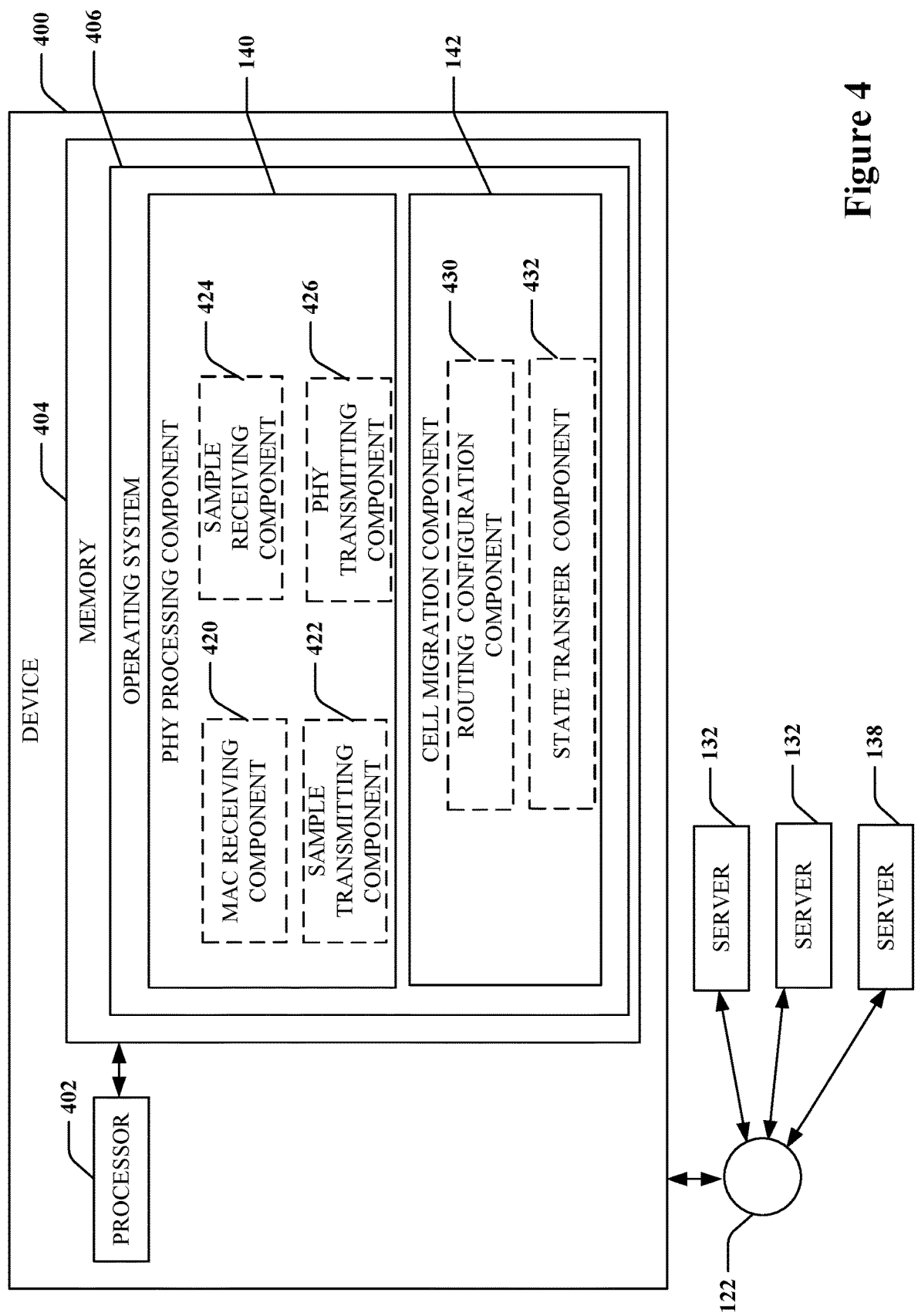
FIG. 4 is a schematic diagram of an example of a device for performing cell migration in a virtualized RAN, in accordance with aspects described herein.
Figure 5:
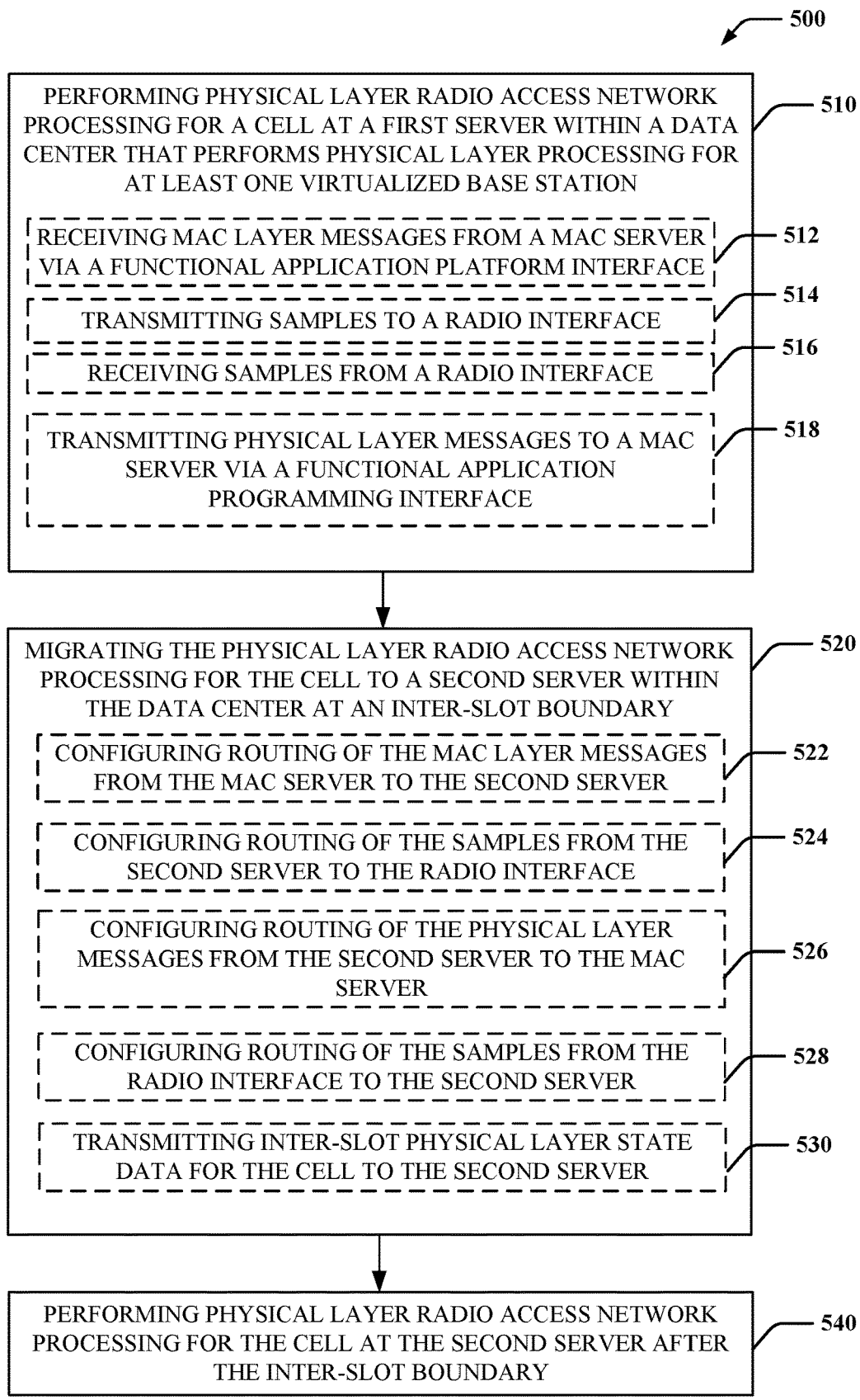
FIG. 5 is a flow diagram of an example of a method of cell migration for a virtualized RAN, in accordance with aspects described herein.

Turning now to FIGS. 1-6, examples are depicted with reference to one or more components and one or more methods that may perform the actions or operations described herein, where components and/or actions/operations in dashed line may be optional. Although the operations described below in FIG. 5 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Figure 1:
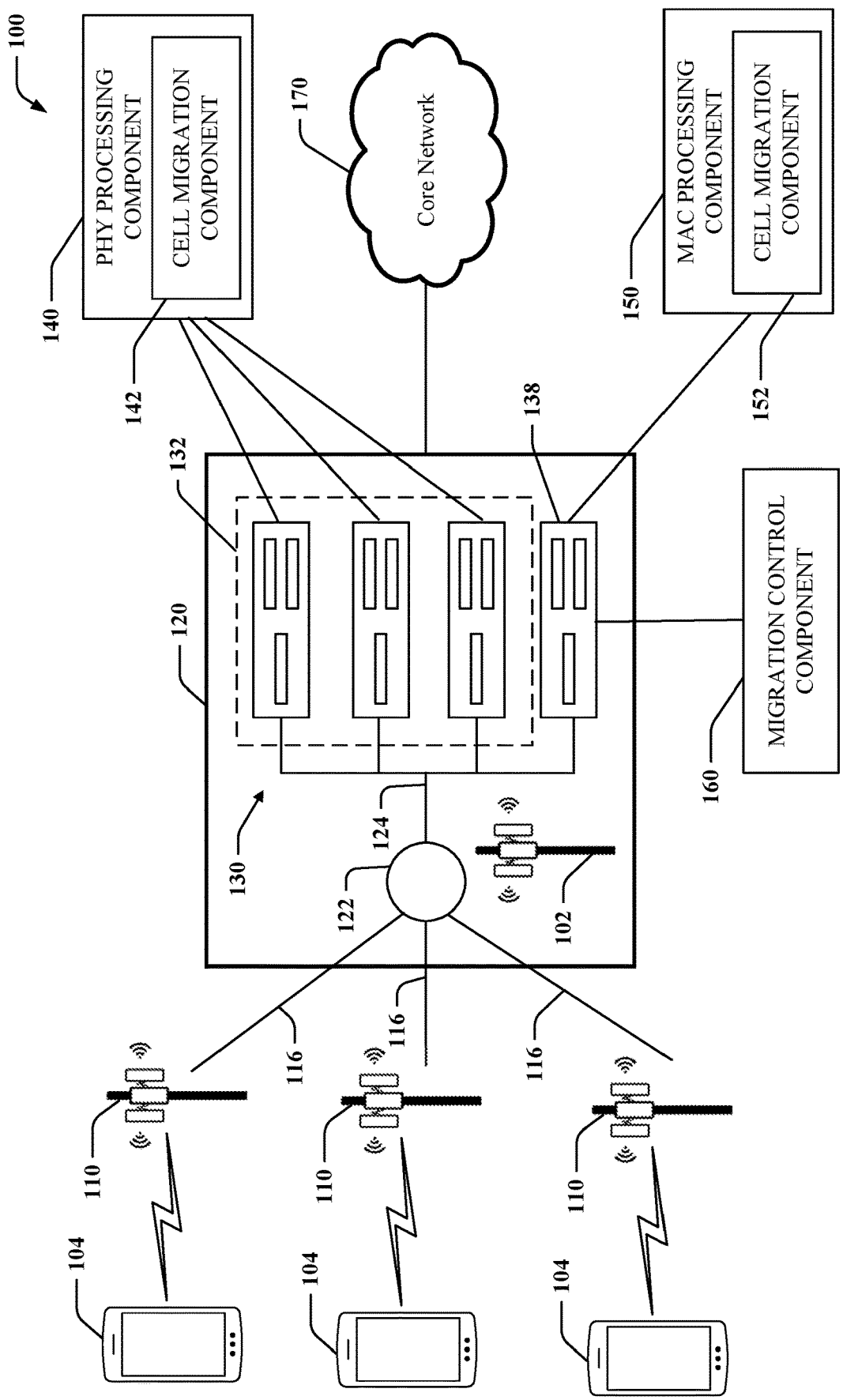
FIG. 1 is a diagram of an example of an architecture for a virtualized radio access network (RAN), in accordance with aspects described herein.

FIG. 1 is a diagram of an example of an architecture for a virtualized RAN 100. The RAN 100 may provide access for user equipment (UEs) 104. The virtualized RAN 100 may include radio units 110, an edge datacenter 120, and a core network 170.

The radio units 110 may include antennas configured to transmit and/or receive radio frequency (RF) signals. In some implementations, the radio units 110 may include RF processing circuitry. For example, the radio units 110 may be configured to convert the received RF signals to baseband samples and/or convert baseband samples to RF signals. The radio units 110 may be connected to the edge datacenter 120 via front-haul connections 116. The front-haul connections 116 may be wired connections such as fiber optic cables.

The edge datacenter 120 may include one or more switches 122, connections 124, and a plurality of servers 130. The edge datacenter 120 may provide a virtualized base station 102 for performing RAN processing for one or more cells. In an aspect, the plurality of servers 130 may include PHY servers 132 and a higher layer server 138. The servers may be generic computing resources. For example, the servers may be hardware servers or virtual servers. In some implementations, PHY layer processing may be more resource intensive than higher layer processing. For example, the MAC layer, a radio link control (RLC) layer, and a radio resource control (RRC) layer may be executed on a single higher layer server 138 whereas multiple PHY servers 132 may perform PHY layer processing. The plurality of servers 130 may be connected to the switch 122 and to each other via connections 124, which may be wired connections such as Ethernet. In an aspect, the links between the radio units 110 and the plurality of servers 130 may include only wired connections. That is, the links may exclude wireless connections to avoid a wireless protocol stack. Further, wired connections 116 and 124 may provide reliability and/or allow use of direct memory access (DMA) operations.

In an aspect, each PHY server 132 includes a PHY processing component 140 configured to perform PHY layer processing for at least one virtualized base station. For instance, a virtualized base station may provide one or more cells from a radio unit 110. In an aspect, the PHY layer processing may be performed according to a functional application platform interface (FAPI) protocol. For instance the Small Cell Forum publishes a suite of FAPI protocols including a PHY API that defines control between the MAC layer and the PHY layer. In an aspect, FAPI messages may be transmitted between the higher layer server 138 and the PHY servers 132 via UDP packets. An interface between the radio units 110 and the edge datacenter 120 may be implemented by, for example, the O-RAN 7.2× fronthaul protocol, published by the O-RAN Working Group #4. The FAPI protocols also include an RF and Digital Front End Control API, which may define the interface between the radio units 110 and the edge datacenter 120 in some implementations.

The PHY layer processing may include forward error correction (FEC) coding/decoding of the transport channels, interleaving, rate matching, mapping onto physical channels, modulation/demodulation of physical channels, and MIMO antenna processing. Modulation may include mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates may be used to determine the coding and modulation scheme, as well as for spatial processing. The channel estimate may be derived from a reference signal and/or channel condition feedback transmitted by a user device 104. Each spatial stream may then be provided to a different antenna of the radio unit 110.

In an aspect, one or more of the servers 130 include a migration control component 160 configured to migrate the PHY layer RAN processing for the cell to a second server within the datacenter at an inter-slot boundary. In some implementations, for example, the migration control component 160 may be located at the higher layer server 138. The migration control component 160 may communicate with the switch 122, the MAC processing component 150, the PHY processing component 140, and/or the radio unit 110 to migrate the cell to a second server. For instance, the migration control component 160 may configure routing of MAC layer messages and/or samples to the second server after the inter-slot boundary. As another example, the migration control component 160 may issue commands to transfer inter-slot state data to the second server.

In an aspect, each of the servers 130 may include a cell migration component 142, 152 configured to facilitate migrating the physical layer radio access network processing for the cell to a second server within the datacenter at an inter-slot boundary. For example, the cell migration component 142 at the first PHY server 132 may transfer inter-slot state data to the second PHY server (e.g., in response to a command from the migration control component 160). The cell migration component 152 at the higher layer server 138 may configure routing for MAC layer messages from the MAC processing component 150.

Figure 2:
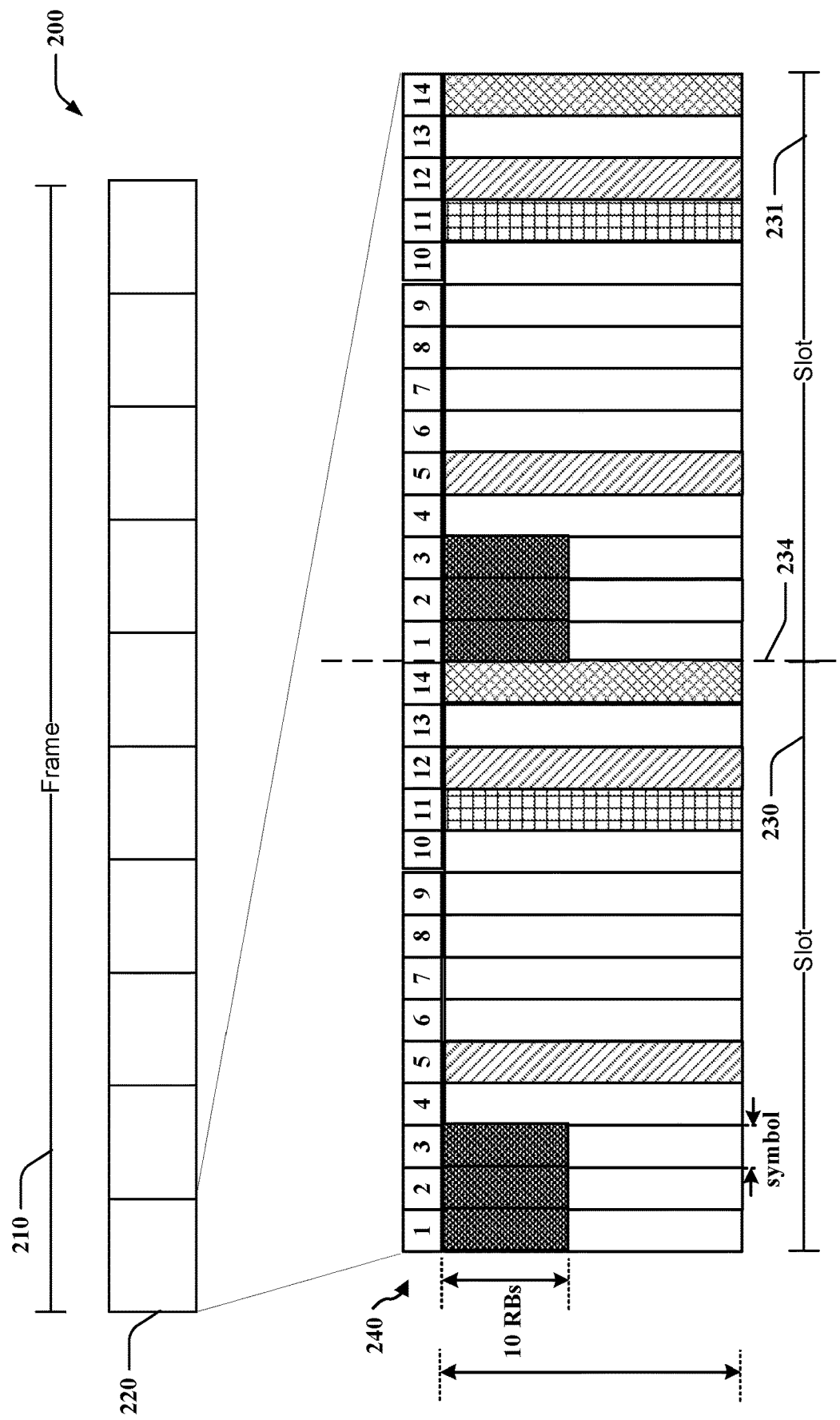
FIG. 2 is a diagram of an example of a frame structure for wireless communications, in accordance with aspects described herein.

FIG. 2 is a diagram of an example of a frame structure 200 for wireless communications. A frame 210 (10 ms) may be divided into 10 equally sized subframes 220 (1 ms). Each subframe may include one or more time slots 230. Each slot 230 may include 7 or 14 symbols, depending on the slot configuration. For instance, for slot configuration 0 (as illustrated), each slot may include 14 symbols, and for slot configuration 1, each slot may include 7 symbols. The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing.

A resource grid 240 may be used to represent the frame structure. Each time slot 230 includes a resource block (RB) (also referred to as physical RBs (PRBs)) that extends 12 consecutive subcarriers. The resource grid is divided into multiple resource elements (REs). The number of bits carried by each RE depends on the modulation scheme.

In an aspect, PHY layer processing may be performed on a slot basis. For example, the FAPI protocols may define requests for downlink messages to transmit and indications of uplink received messages. The PHY layer may map the messages to resources within the slot 230. A migration of a cell may occur at a slot boundary 234. That is, a first server may perform all PHY layer processing for a cell prior to a slot boundary (e.g., up to and including slot 230), and a second server may perform all PHY layer processing after the slot boundary (e.g., in slot 231 onwards).

FIG. 3 is a diagram 300 of examples of cell migration in a virtualized RAN. For example, the migration control component 160 may migrate cells between a first PHY server 132a, a second PHY server 132b, and a third PHY server 132c to achieve a first configuration 310, a second configuration 320, or a third configuration 330.

In the first configuration 310, cells 302 may be evenly distributed among the PHY servers 132. For example, the first configuration 310 may be selected when each cell has a relatively equal load as measured by, for example, a number of connected devices or a total throughput.

In the configuration 320, a cell 302a may be migrated from the second PHY server 132b to the first PHY server 132a. For example, a cell 302b remaining on the second server 132b may have a larger load than the cell 302a. Accordingly, although the first PHY server 132a may perform processing for a larger number of cells than the second PHY server 132b, a total processing load for each cell may be approximately equal. The migration control component 160 may migrate cells to achieve a desired load on each cell.

In the third configuration 330, the third PHY server 132c may be shut down. For example, the total PHY processing load for the datacenter 120 may sufficiently low that only two PHY servers are needed. The migration control component 160 may migrate all of the cells off of the PHY server 132 and to shut the server down. Accordingly, the third configuration 330 may provide power savings by reducing computing resources for performing PHY processing. The third configuration 330 may also be used in case of a server fault or maintenance. For example, unlike dedicated processing hardware for a cell, a server in the datacenter 120 may be temporarily shut down for maintenance while the cell remains operational on a different server.

FIG. 4 is a schematic diagram of an example of a device 400 (e.g., a computing device) for migrating. The device 400 may be an example of a PHY server 132. The device 400 resides within a datacenter (e.g., the datacenter 120). The datacenter may be an edge datacenter. The device 400 is connected to other servers within the datacenter via the switch 122 and wired connections. In particular, the device 400 is connected to a higher layer server 138 and at least one other PHY server 132.

In an example, device 400 can include a processor 402 and/or memory 404 configured to execute or store instructions or other parameters related to providing an operating system 406, which can execute one or more applications or processes, such as, but not limited to, at least one of a PHY processing component 140 for performing physical layer radio access network processing for a cell at a first server within a datacenter that performs physical layer processing for at least one virtualized base station or a cell migration component 142 for migrating the physical layer radio access network processing for the cell to a second server within the datacenter at an inter-slot boundary. For example, processor 402 and memory 404 may be separate components communicatively coupled by a bus (e.g., on a motherboard or other portion of a computing device, on an integrated circuit, such as a system on a chip (SoC), etc.), components integrated within one another (e.g., processor 402 can include the memory 404 as an on-board component), and/or the like. Memory 404 may store instructions, parameters, data structures, etc. for use/execution by processor 402 to perform functions described herein.

In an example, the PHY processing component 140 may optionally include one or more of a MAC receiving component 420 configured to receive MAC layer messages from a MAC server via a FAPI protocol, a sample transmitting component 422 configured to transmit samples to a radio interface, a sample receiving component 424 configured to receive samples from a radio interface, or a PHY transmitting component 426 configured to transmit physical layer messages to a MAC server via a FAPI protocol. For instance, for downlink transmissions, the MAC receiving component 420 may receive FAPI request messages from the MAC processing component 150 via the switch 122 and connections 124. The PHY processing component 140 may perform PHY processing based on the request (e.g., as defined in a standards document such as 3GPP specifications) to generate IQ data. The sample transmitting component 422 may transmit the IQ data as samples to the radio unit 110 for the cell via the switch 122 and the connection 116. Conversely, for uplink transmissions, the sample receiving component 424 may receive IQ data from the radio unit 110. The PHY transmitting component 426 may receive FAPI request messages from the MAC processing component 150 indicating an expected transmission from the user device. The PHY processing component 140 may perform PHY processing on the IQ data based on the request to generate a physical layer message. The PHY transmitting component 426 may transmit a physical layer message to the MAC processing component 150.

In an example, the cell migration component 142 may optionally include a routing configuration component 430 configured to configure routing of MAC messages, physical layer messages, or samples based on a cell migration. For example, the routing configuration component 430 may update addresses at the PHY processing component 140, the MAC processing component 150, or the switch 122 to direct messages to the correct server. For instance, the switch 122 may include a routing table that directs samples from radio units or FAPI messages from the MAC processing component 150 to the correct server based on the cell ID. Alternatively, each cell may be configured with a unique IP address and each of the devices that generates a message may be configured to insert the IP address of the cell into the message header. The routing configuration component 430 may update a routing table at the switch 122 to change the destination server for the IQ samples for the IP address associated with the cell.

The cell migration component 142 may optionally include a state transfer component 432 configured to transmit inter-slot state data to a second PHY server 132. The inter-slot physical layer state data may be state data that is used for physical layer processing that is valid over at least two slots. For example, the inter-slot physical layer state data may be valid during a first slot in which the data is created and in a second slot in which the state data is used or consumed. The inter-slot physical layer state data may be contrasted with intra-slot state data that is valid in only one slot. Physical layer processing may generate large amounts of intra-slot state data such as channel estimates, modulation symbols, transmission matrices, etc. Transferring intra-slot state data between servers may not be feasible due to the quantity of data produced within a short time period. For example, by the time the intra-slot state data is transferred to another server, the slot may be over. Inter-slot state data may include information such as hybrid automatic repeat request (HARQ) retransmission buffers, beamforming information, and channel quality information (CQI). The amount of inter-slot state data may be relatively smaller than the amount of intra-slot state data.

In some implementations, the state transfer component 432 may be configured to periodically transmit inter-slot physical layer state data to a state store at one or more other servers within the datacenter 120. The state transfer component 432 may transmit the inter-slot state data generated during PHY processing at the local PHY server 132 to one or more other PHY servers. In some implementations, the state transfer component 432 may be configured to transmit inter-slot physical layer state data for the cell to the second server. For example, the state transfer component 432 may transmit the inter-slot physical layer state data in response to a migration command. Transmitting the state information between PHY servers 130 may rely on fast and reliable datacenter transport. For example, in some implementations, the first PHY server 132a may utilize remote direct memory access (RDMA) to write directly to the memory of the other PHY servers 130 with minimal additional processing. In some implementations, the first PHY server 132a may utilize user datagram protocol (UDP) to transmit the state data. Within an edge datacenter, UDP can be made lossless using Ethernet priority flow control. In some implementations, the FAPI protocol may be extended to include one or more functions for transferring inter-slot physical layer state data for the cell. For example, the FAPI protocol may include a SAVE_STATE command and a LOAD_STATE command.

FIG. 5 is a flow diagram of an example of a method 500 for migrating a cell between servers for a virtualized RAN. For example, the method 500 can be performed by a device 400 and/or one or more components thereof to migrate a cell between servers for a virtualized RAN.

At block 510, the method 500 includes performing physical layer radio access network processing for a cell at a first server within a datacenter that performs physical layer processing for at least one virtualized base station. In an example, the PHY processing component 140, e.g., in conjunction with processor 402, memory 404, and operating system 406, can perform physical layer radio access network processing for a cell (e.g., cell 302) at a first server (e.g., PHY server 132a) within a datacenter 120 that performs physical layer processing for at least one virtualized base station 102.

In some implementations, the PHY layer processing is based on MAC layer messages (e.g., FAPI messages) with a MAC server such as the higher layer server 138. For example, at sub-block 512, the block 510 optionally includes receiving MAC layer messages from a MAC server via a functional application platform interface. For instance, the MAC layer messages may include FAPI requests. In some implementations, at sub-block 514, the block 510 optionally includes transmitting samples to a radio interface (e.g., radio unit 110). The samples may be quadrature baseband (IQ) data. The PHY processing component 140 may also transmit configuration messages to the radio interface. In some implementations, at sub-block 516, the block 510 optionally includes receiving samples from a radio interface (e.g., radio unit 110). The PHY processing component 140 may also receive indications from the radio interface. In some implementations, at sub-block 518, the block 510 optionally includes transmitting physical layer messages to a MAC server via a functional application programming interface. For instance, the physical layer messages may include FAPI indications.

At block 520, the method 500 includes migrating the physical layer radio access network processing for the cell to a second server within the datacenter at an inter-slot boundary. In an example, the cell migration component 142 and/or the routing configuration component 430, e.g., in conjunction with processor 402, memory 404, and operating system 406, can migrate the physical layer radio access network processing for the cell 302 to a second server (e.g., PHY server 132*b*) within the datacenter 120 at an inter-slot boundary 234.

For example, in sub-block 522, the block 520 may optionally include configuring routing of the MAC layer messages from the MAC server to the second server. In sub-block 524, the block 520 may optionally include configuring routing of the samples from the second server to the radio interface. In sub-block 526, the block 520 may optionally include configuring routing of the physical layer messages from the second server to the MAC server. In sub-block 528, the block 520 may optionally include configuring routing of the samples from the radio interface to the second server.

In some implementations, in sub-block 530, the block 520 may optionally include transmitting inter-slot physical layer state data for the cell to the second server. In some implementations, the migration component 142 may periodically transmit the inter-slot state data to a state store at the second server that stores the inter-slot physical layer state data for at least one virtualized base station. Accordingly, the migration may occur without further transfer of inter-slot state data. In some implementations, the cell migration component 142 and/or the state transfer component 432 may transmit the inter-slot physical layer state data for the cell to the second server, for example, in response to a migration command from the higher layer server 138. In some implementations, the FAPI protocol may be extended to include one or more functions for transferring inter-slot physical layer state data for the cell.

At block 540, the method 500 includes performing physical layer radio access network processing for the cell at the second server after the inter-slot boundary. In an example, the PHY processing component 140 at the second PHY server 132*b*, e.g., in conjunction with processor 402, memory 404, and operating system 406, can perform the physical layer radio access network processing for the cell 302 at the second server 132*b* after the inter-slot boundary 234. In some implementations, the block 540 may include one or more of the sub-blocks 512, 514, 516, or 518.

Figure 6:
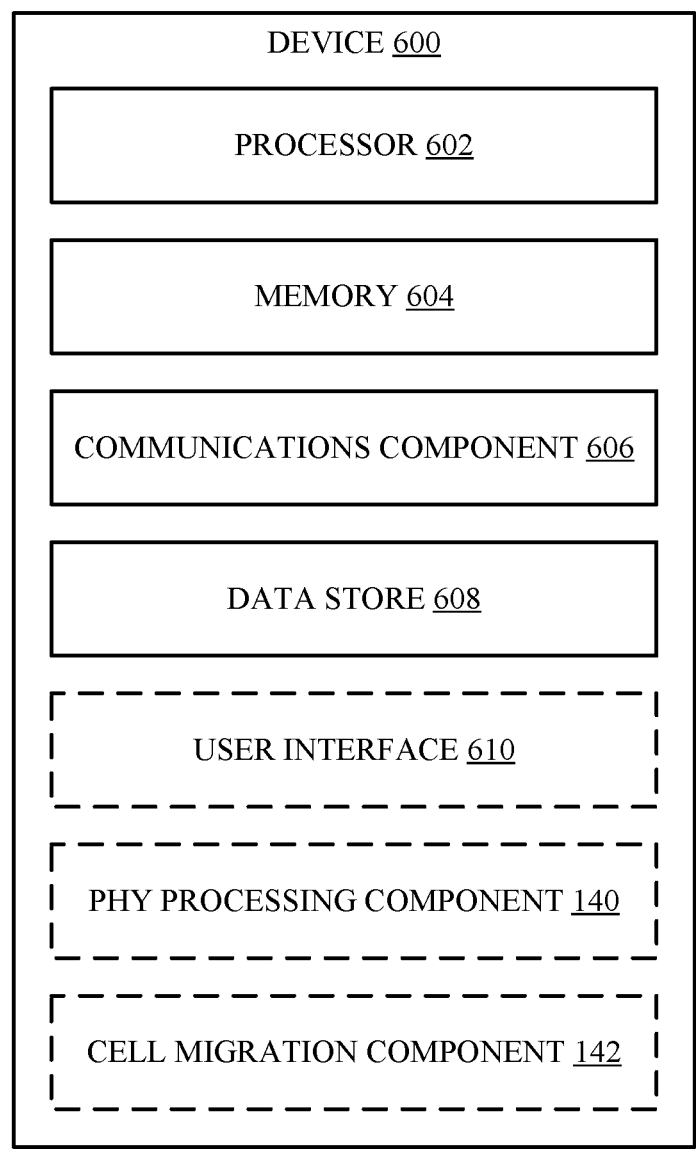
FIG. 6 is a schematic diagram of an example of a device for performing functions described herein, in accordance with aspects described herein.

FIG. 6 illustrates an example of a device 600 including additional optional component details as those shown in FIG. 4. In one aspect, device 600 may include processor 602, which may be similar to processor 402 for carrying out processing functions associated with one or more of components and functions described herein. Processor 402 can include a single or multiple set of processors or multi-core processors. Moreover, processor 602 can be implemented as an integrated processing system and/or a distributed processing system.

Device 600 may further include memory 604, which may be similar to memory 404 such as for storing local versions of operating systems (or components thereof) and/or applications being executed by processor 602, such as PHY processing component 140, cell migration component 142, etc. Memory 604 can include a type of memory usable by a computer, such as random access memory (RAM), read only memory (ROM), tapes, magnetic discs, optical discs, volatile memory, non-volatile memory, and any combination thereof.

Further, device 600 may include a communications component 606 that provides for establishing and maintaining communications with one or more other devices, parties, entities, etc. utilizing hardware, software, and services as described herein. Communications component 606 may carry communications between components on device 600, as well as between device 600 and external devices, such as devices located across a communications network and/or devices serially or locally connected to device 600. For example, communications component 606 may include one or more buses, and may further include transmit chain components and receive chain components associated with a wireless or wired transmitter and receiver, respectively, operable for interfacing with external devices.

Additionally, device 600 may include a data store 608, which can be any suitable combination of hardware and/or software, that provides for mass storage of information, databases, and programs employed in connection with aspects described herein. For example, data store 608 may be or may include a data repository for operating systems (or components thereof), applications, related parameters, etc.) not currently being executed by processor 602. In addition, data store 608 may be a data repository for PHY processing component 140, cell migration component 142, and/or one or more other components of the device 600.

Device 600 may optionally include a user interface component 610 operable to receive inputs from a user of device 600 and further operable to generate outputs for presentation to the user. User interface component 610 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 610 may include one or more output devices, including but not limited to a display, a speaker, a haptic feedback mechanism, a printer, any other mechanism capable of presenting an output to a user, or any combination thereof.

Device 600 may additionally include a PHY processing component 140 for performing physical layer processing for a cell of at least one virtualized base station, a migration component 142 for migrating the physical layer processing for the cell to a second server, etc., as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A system for operating virtualized base stations, comprising:
   a plurality of physical layer (PHY) servers within a datacenter, each respective PHY server comprising:
      a memory storing one or more parameters or instructions for performing PHY processing for one or more cells of a virtualized base station; and
      at least one processor coupled to the memory, wherein the at least one processor is configured to perform physical layer radio access network processing for a cell at the respective PHY server based on media access control (MAC) layer messages from a MAC server for each of a plurality of slots; and
   the MAC server, comprising:
      a memory storing one or more parameters or instructions for performing MAC layer processing for one or more cells; and
      at least one processor coupled to the memory, wherein the at least one processor is configured to migrate the physical layer radio access network processing for the cell from a first server of the plurality of PHY servers to a second server of the plurality of PHY servers within the datacenter at an inter-slot boundary.

2. The system of claim 1, wherein the at least one processor of the respective PHY server is configured to:
   receive the MAC layer messages from the MAC server via a functional application platform interface; and
   transmit samples to a radio interface.

3. The system of claim 2, wherein to migrate the physical layer radio access network processing for the cell the at least one processor of the MAC server is configured to:
   configure routing of the MAC layer messages from the MAC server to the second server after the inter-slot boundary; and
   configure routing of the samples from the second server to the radio interface after the inter-slot boundary.

4. The system of claim 2, wherein the at least one processor of the respective PHY server is configured to receive the MAC layer messages from the MAC server as user datagram protocol (UDP) packets from the MAC server including MAC layer messages.

5. The system of claim 1, wherein the at least one processor of the respective PHY server is configured to:
   receive samples from a radio interface; and
   transmit physical layer messages to the MAC server via a functional application programming interface.

6. The system of claim 5, wherein to migrate the physical layer radio access network processing for the cell the at least one processor of the MAC server is configured to:
   configure routing of the physical layer messages from the second server to the MAC server after the inter-slot boundary; and
   configure routing of the samples from the radio interface to the second server after the inter-slot boundary.

7. The system of claim 5, wherein the at least one processor of the respective PHY server is configured to transmit the physical layer messages to the MAC server as user datagram protocol (UDP) packets including physical layer messages to the MAC server.

8. The system of claim 1, wherein the second server includes a state store that stores inter-slot physical layer state data for the cell.

9. The system of claim 1, wherein the at least one processor of the respective PHY server is configured to transmit inter-slot physical layer state data for the cell to the second server.

10. The system of claim 1, wherein a functional application platform interface for performing the physical layer radio access network processing includes one or more functions for transferring inter-slot physical layer state data for the cell.

11. A method, comprising:
   performing physical layer radio access network processing for a cell at a first server within a datacenter that performs physical layer processing for at least one virtualized base station based on media access control (MAC) layer messages from a MAC server for each of a plurality of slots;
   migrating the physical layer radio access network processing for the cell to a second server within the datacenter at an inter-slot boundary; and
   performing physical layer radio access network processing for the cell based on the MAC layer messages from a MAC server at the second server after the inter-slot boundary.

12. The method of claim 11, wherein performing the physical layer radio access network processing comprises:
   receiving the MAC layer messages from a MAC server via a functional application platform interface; and
   transmitting samples to a radio interface.

13. The method of claim 12, wherein migrating the physical layer radio access network processing for the cell comprises:

configuring routing of the MAC layer messages from the MAC server to the second server after the inter-slot boundary; and configuring routing of the samples from the second server to the radio interface after the inter-slot boundary.

14. The method of claim 12, wherein receiving the MAC layer messages from the MAC server comprises receiving a user datagram protocol (UDP) packet from the MAC server including a MAC layer message.

15. The method of claim 11, wherein performing the physical layer radio access network processing comprises:

receiving samples from a radio interface; and transmitting physical layer messages to a MAC server via a functional application programming interface.

16. The method of claim 15, wherein migrating the physical layer radio access network processing for the cell comprises:

configuring routing of the physical layer messages from the second server to the MAC server after the inter-slot boundary; and configuring routing of the samples from the radio interface to the second server after the inter-slot boundary.

17. The method of claim 15, wherein transmitting the physical layer messages to the MAC server comprises transmitting a user datagram protocol (UDP) packet including a physical layer message to the MAC server.

18. The method of claim 11, wherein the second server includes a state store that stores inter-slot physical layer state data for the cell.

19. The method of claim 11, wherein migrating the physical layer radio access network processing for the cell to the second server comprises transmitting inter-slot physical layer state data for the cell to the second server.

20. The method of claim 11, wherein a functional application platform interface for performing the physical layer radio access network processing includes one or more functions for transferring inter-slot physical layer state data for the cell.

* * * * *